United States Patent [11] 3,627,061

| [72] | Inventor | John Warren Sample |
|---|---|---|
| | | Ankeny, Iowa |
| [21] | Appl. No. | 864,459 |
| [22] | Filed | Oct. 7, 1969 |
| [45] | Patented | Dec. 14, 1971 |
| [73] | Assignee | Deere & Company |
| | | Moline, Ill. |

[54] EARTHWORKING TOOL MOUNTING MEANS
2 Claims, 6 Drawing Figs.

[52] U.S. Cl. .................................................. 172/462,
172/497, 172/646, 172/711
[51] Int. Cl. ....................................................A01b65/06,
A01b 71/02
[50] Field of Search............................................ 172/140,
239, 439, 449, 462, 506, 497–500, 619, 657, 661,
663, 675, 677, 706, 710, 711, 705, 572, 573;
267/41, 56

[56] References Cited
UNITED STATES PATENTS
| 286,540 | 10/1883 | Hoke........................... | 172/498 |
|---|---|---|---|
| 368,158 | 8/1887 | Moore.......................... | 172/499 |
| 746,432 | 12/1903 | Ackerman.................... | 172/500 |
| 1,432,529 | 10/1922 | Burke........................... | 267/41 |
| 1,951,477 | 3/1934 | Gannett........................ | 267/41 |
| 2,522,702 | 9/1950 | Charley........................ | 172/691 |
| 2,644,387 | 7/1953 | Kamplade ................... | 172/711 |
| 2,756,662 | 7/1956 | Christensen.................. | 172/462 |
| 3,049,181 | 8/1962 | Oerman et al. .............. | 172/239 |
| 3,052,306 | 9/1962 | Lynch .......................... | 172/140 |
| 3,305,230 | 2/1967 | Musser......................... | 267/41 |

FOREIGN PATENTS
| 55,677 | 12/1943 | Netherlands................. | 172/711 |
|---|---|---|---|

*Primary Examiner*—Robert E. Pulfrey
*Assistant Examiner*—C. W. Hanor
*Attorneys*—H. Vincent Harsha, Harold M. Knoth, William A. Murray and John M. Nolan

ABSTRACT: A resilient, two-way, vertically effective leaf spring means is operative between a support and an associated earthworking tool such as a cultivator to provide a down pressure on the cultivator when the support is lowered and to resiliently lift the cultivator when the support is raised.

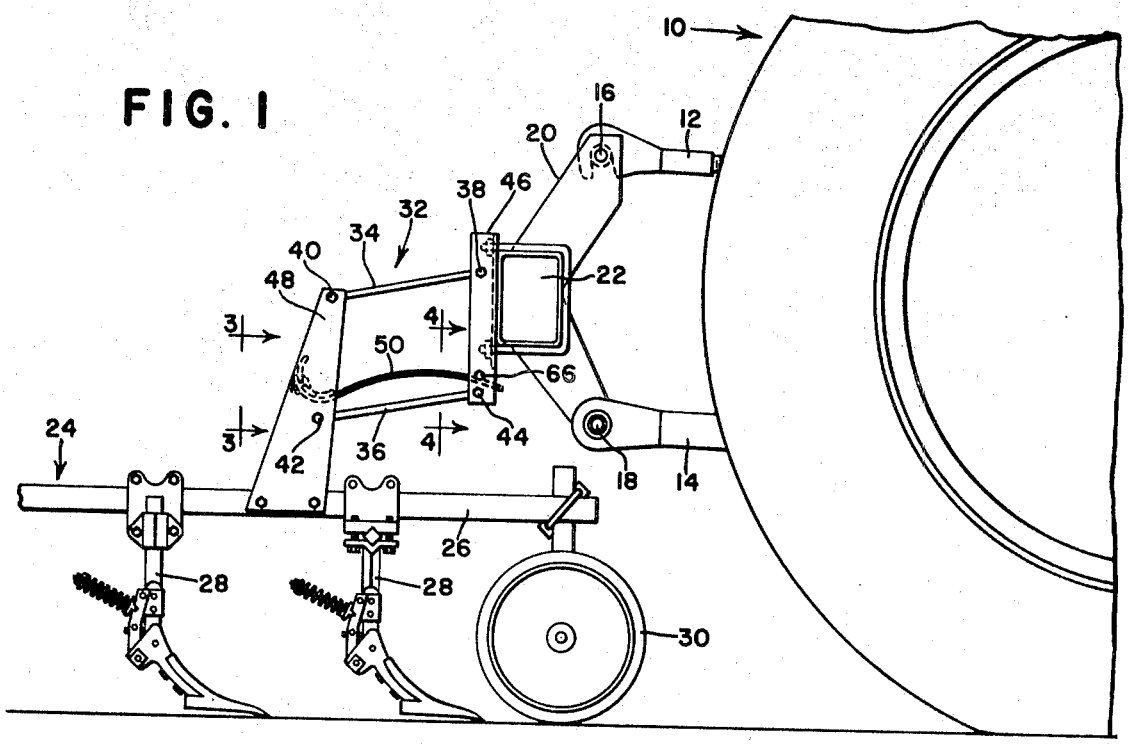
FIG. 1
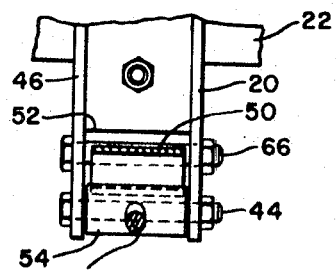
FIG. 4
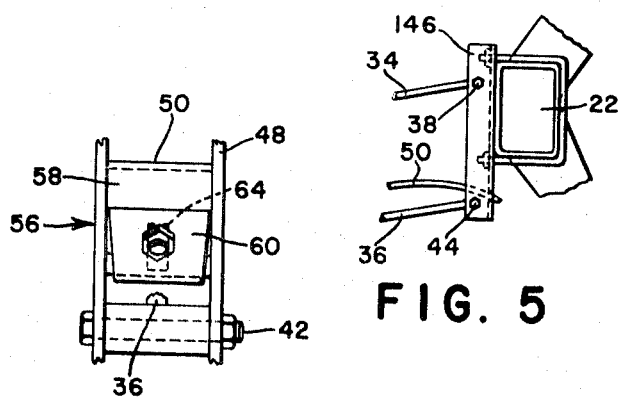
FIG. 2
FIG. 3
FIG. 5
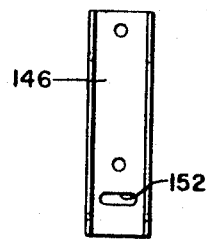
FIG. 6
INVENTOR.
J. W. SAMPLE

EARTHWORKING TOOL MOUNTING MEANS

BACKGROUND OF THE INVENTION

This invention relates to an earth-working or -traversing implement, typical of the general character of which is one that includes a support or toolbar carried by a tractor or similar mobile frame and itself mounting a vertically adjustable tool to which lifting and lowering forces are applied, usually by raising and lowering the support, as by the tractor hydraulic system. Conventionally, this is achieved by interconnecting the tool and support by parallel or four-bar link means and adding a lift link which raises and lowers the tool, and a compression spring encircles the lift link so as to apply down pressure to the tool. But this spring has no effect during the raising of the tool or during the transport thereof.

SUMMARY OF THE INVENTION

According to the present invention, a cantilever-mounted leaf spring is connected between the tool and support in such manner as to be capable of exerting both up and down forces on the tool, depending upon the status of the support as raised or lowered. The mounting of the spring is such that its effective force may be adjusted to accommodate different conditions, and the adjustable mounting is of simple low-cost nature. In its broader aspect, the invention contemplates the use of such spring between the support and tool carrier elements of agricultural implements of the type in which the elements are basically interconnected by linkage, such as a four-bar linkage, for relative vertical movement, and in the case of a four-bar linkage the spring means is disposed intermediate the upper and lower links.

BRIEF DESCRIPTION OF THE DRAWINGS

FIG. 1 is a fragmentary elevation of a rear portion of a typical tractor-mounted installation;

FIG. 2 is an enlarged fragmentary view showing the spring mounting; FIG. 3 is an enlarged fragmentary view as seen along the line 3—3 on FIG. 1;

FIG. 4 is an enlarged section as seen along the line 4—4 on FIG. 1;

FIG. 5 is a fragmentary side elevation of a modified form of the invention; and

FIG. 6 is a rear elevation of one of the parts illustrated in FIG. 5.

DESCRIPTION OF THE PREFERRED EMBODIMENT

The numeral 10 designates generally a typical hydraulic lift-equipped agricultural tractor as representative of a mobile frame with which the invention is useful. This tractor has the usual upper and lower draft links 12 and 14, respectively, to the rear ends of which is connected, by upper and lower pivots 16 and 18, a coupler 20 on which is rigidly mounted a transverse support element in the form of a toolbar 22. An earth-working or -traversing implement, here a cultivator 24, is arranged in trailing relation to the toolbar and has a frame or carrier element 26 for mounting a plurality of cultivator shovels 28 and a gauge wheel 30.

A linkage 32 connects the cultivator to the toolbar for ground-traversing movement in unison and further provides for relative vertical movement between the two. This linkage may be a typical four-bar linkage, here including upper and lower links 34 and 36 pivotally connected on transverse pivots 38, 40, 42 and 44 to a bracket 46 rigid on the toolbar 22 and to a mast 48 rigid on the cultivator frame or carrier element 26.

Operative between the toolbar and cultivator is a leaf spring 50 having one end cantilever-mounted on the mast 48 and its free end confined vertically between upper and lower abutments 52 and 54 on the bracket 46 and confined laterally between the opposite side members of the bracket (FIG. 4). The cantilever mounting, denoted in its entirety at 56 (FIGS. 2 and 3), includes an arcuate transverse support 58 rigidly secured between opposite sides of the mast 48 and a matching arcuate end 60 on the spring 50, together with releasable securing means for securing the spring in selected angular positions on the support 58. The securing means may include a bolt and nut assembly 62 and slots 64 in the support and/or spring end 60. By varying the angular position of the spring 50 on the support 58, the range in which the cultivator operates with respect to the toolbar 22 is varied. For example, if the rear end of the spring 60 is rotated counterclockwise as viewed in FIGS. 1 and 2, the working range of the cultivator with respect to the toolbar is lowered. Also, for a given lowered position of the toolbar 22, a variance in the angular position of the spring 50 on the support 58 will vary the effective force or length of the spring 50 between the mast 48 and abutment 52 in applying a down pressure on the cultivator 24.

The upper abutment may include a spacer secured by a bolt and nut 66 between the sides of the bracket 46 (FIG. 4) and the lower abutment may include a similar spacer, as shown, mounted on the lower pivot 44. The abutments are spaced vertically apart a distance slightly greater than the thickness of the spring so that the spring can move freely between the abutments.

The simplified and economical construction performs more than adequately as a two-way-acting spring device in association with the linkage-connected elements 22 and 24. This is best exemplified in FIG. 1, which represents a condition in which the support or toolbar 22 has been lowered by lowering the hitch links 12 and 14 of the tractor. The upper abutment 52 contacts the free or front end of the spring 50 from above and exerts a downward force thereon, resisted by the cantilever-mounted end of the spring as the cultivator shovels engage the ground. Continued lowering of the toolbar causes the spring to deflect further and increase its down pressure on the shovels and this force yieldingly resists attempts of the shovels to ride out of the ground.

Conversely, when the hitch links 12 and 14 are raised, as to lift the implement to transport position, the toolbar 22 rises to an elevated position and the lower abutment 54 engages the free end of the spring 50 from below, and the weight of the cultivator, in opposition, tends to flex the spring 50 in the opposite direction, but the cultivator is nevertheless raised to transport position, in which condition the spring acts as a cushioning means to absorb shock loads arising as the implement outfit encounters rough terrain. These results cannot be achieved by the conventional coil spring arrangements of the prior art.

A second embodiment of the invention is illustrated in FIGS. 5 and 6 and includes a slightly modified mounting bracket 146. The mounting bracket 146 is rigid with the toolbar 22, and the forward ends of the upper and lower links 34 and 36 are pivotally connected to the bracket 146 by pivots 38 and 44 respectively. The bracket 146 differs from the bracket 46 in that its forward wall or bight portion extends the entire vertical dimension of the bracket and is provided with an elongated slot 152 near the lower pivot 44. The forward end of the spring 50 extends through the slot 152 so that the upper and lower edges of the slot serve as the upper and lower abutments. The second embodiment of the invention functions in exactly the same manner as the first described embodiment, but is somewhat simpler in that the single slot 152 in the second embodiment replaces the upper and lower spacers 52 and 54 and bolt and nut assembly 66 in the first embodiment.

Although two preferred embodiments of the invention have been described and illustrated, additional modifications within the scope of the invention will become apparent to those skilled in the art and can be made without departing from the underlying principles of the invention.

I claim:

1. An agricultural implement including a support element adapted to be carried by a mobile frame, an earthworking tool carrier element, upper and lower links means pivotally interconnecting the two elements for ground traversal in unison and enabling vertical movement of the carrier element relative to the support element, a vertically effective leaf spring disposed intermediate the upper and lower link means having one end cantilever mounted on one element and its other end positioned between upper and lower abutments on the other element, characterized in that the cantilever-mounted end of the spring is arcuate about a transverse axis, a matching arcuate support is carried by the one element and is engaged by the arcuate end of the spring, the arcuate support and arcuate end have registrable openings therein, one of which is elongated in the arcuate direction, and releasable securing means extending through the openings for connecting the arcuate support and the arcuate end of the spring and for enabling selective angular movement therebetween.

2. An agricultural implement including a support element adapted to be carried by a mobile frame for raising and lowering movement, an earthworking tool carrier element, upper and lower link means pivotally interconnecting the two elements for ground traversal in unison and enabling vertical movement of the carrier element relative to the support element, a vertically effective leaf spring disposed intermediate the upper and lower link means having one end cantilever-mounted on one element and its other end extending through transversely elongated slot means provided in the other element whereby lowering movement of the support element acts through the spring and one side of the slot to transmit a downward force to the carrier element and raising movement of the support element acts through the spring and the other side of the slot to exert an upward force on the carrier element, characterized in that the cantilever-mounted end of the spring is arcuate about a transverse axis, a matching arcuate end of the spring, the arcuate end and arcuate support have registrable openings therein, one opening of which is elongated in the arcuate direction, and releasable securing means extending through the openings for connecting the arcuate support and the arcuate end of the spring and for enabling selective angular movement of the spring about the support thereby selectively adjust the effective range of the spring between the elements.

* * * * *

UNITED STATES PATENT OFFICE
CERTIFICATE OF CORRECTION

Patent No. 3,627,061     Dated 14 December 1971

Inventor(s) John Warren Sample

It is certified that error appears in the above-identified patent and that said Letters Patent are hereby corrected as shown below:

Column 4, line 11, before "end" (1st occ.) insert -- support is carried by the one element and is engaged by the arcuate --; line 17, before "thereby" insert -- to --.

Signed and sealed this 20th day of June 1972.

(SEAL)
Attest:

EDWARD M. FLETCHER, JR.　　　　　　ROBERT GOTTSCHALK
Attesting Officer　　　　　　　　　Commissioner of Patents